United States Patent [19]
Leib

[11] 4,056,838
[45] Nov. 1, 1977

[54] IN-BAND SIGNAL-TO-NOISE RATIO MONITOR FOR AN FSK RELAYING SYSTEM

[75] Inventor: Michael J. Leib, Flanders, N.J.

[73] Assignee: Westinghouse Electric Corporation, Pittsburgh, Pa.

[21] Appl. No.: 725,067

[22] Filed: Sept. 20, 1976

[51] Int. Cl.$^2$ .............................................. H02H 3/26
[52] U.S. Cl. .................................... 361/68; 361/86; 361/110
[58] Field of Search .................. 361/68, 67, 78, 86, 361/110; 325/473, 474, 478, 348, 363

[56] References Cited
U.S. PATENT DOCUMENTS

| | | |
|---|---|---|
| 3,387,222 | 6/1968 | Hellwarth et al. ............ 325/474 X |
| 3,443,159 | 5/1969 | Altfather ............................ 361/68 |
| 3,737,781 | 6/1973 | Deerkoski ....................... 325/363 |
| 3,768,021 | 10/1973 | Ramaswamy et al. ............ 325/478 |
| 3,783,387 | 1/1974 | Wernli ........................... 325/478 X |

Primary Examiner—J D Miller
Assistant Examiner—Patrick R. Salce
Attorney, Agent, or Firm—S. A. Seinberg

[57] ABSTRACT

An improved in-band signal-to-noise ratio monitor is used in conjunction with the receiver of an FSK relaying system. The improved monitor measures the signal-to-noise ratio both prior to and after the receiver input signal is filtered by a narrow bandpass filter. The magnitudes of the measured ratios are compared and, if all signal-to-noise ratio permissives are not satisfied, the tripping function of the relaying system at the receiver or local station is blocked or inhibited.

8 Claims, 3 Drawing Figures

IN-BAND SIGNAL-TO-NOISE RATIO MONITOR FOR AN FSK RELAYING SYSTEM

CROSS-REFERENCES TO RELATED APPLICATIONS

This application is an improvement over U.S. application Ser. No. 568,233 filed Apr. 15, 1975 in the name of R. E. Ray and assigned to the same assignee as in this application, and now abandoned.

BACKGROUND OF THE INVENTION

Application Ser. No. 568,233 discloses and claims an in-band signal-to-noise ratio monitor in which the ratio is determined by deriving the log of the output voltage of a narrow bandpass filter which has its center frequency at the same frequency as the center frequency of the signal. The apparatus as disclosed in said application Ser. No. 568,233 does not distinguish in its output between a signal-to-noise ratio above and below unity so that a low or complete lack of signal cannot be distinguished from a satisfactory signal-to-noise ratio.

SUMMARY OF THE INVENTION

Accordingly, an improved signal-to-noise ratio monitor is provided for use in a relaying network of the type described wherein the logarithm of the voltage at the input and output of a narrow bandpass filter is determined and then rectified. The rectified voltages, which are proportional to the absolute value of the signal-to-noise ratios of the filtered and unfiltered received signal, are then compared to determine which is greater. Simultaneously, the rectified voltage corresponding to the signal-to-noise ratio of the filtered signal is compared to a reference or blocking level signal. The resultant signals of both comparisons are then logically compared to generate a blocking signal whenever the signal-to-noise ratio of the received signal exceeds a predetermined value, that is, whenever the compared signals reach a predetermined relationship. With this arrangement, the monitor can distinguish between an S/N ratio and an N/S ratio. The blocking signal is utilized by the relaying network to block or inhibit a trip relay.

DESCRIPTION OF THE PREFERRED EMBODIMENT

Figure 1:
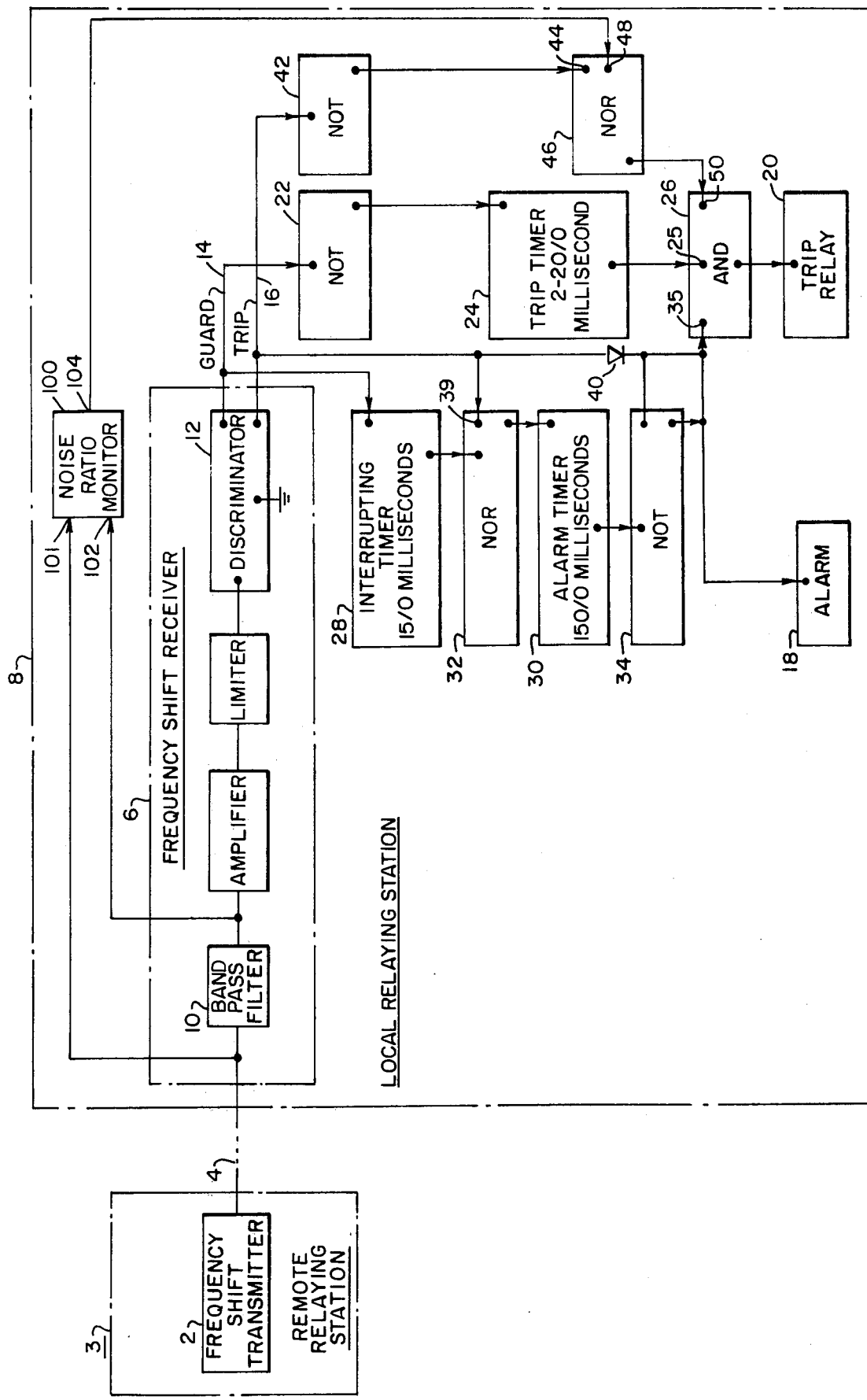
FIG. 1 is a block diagram of a frequency shift keying relaying apparatus embodying the invention.

U.S. Pat. No. 3,443,159 dated May 6, 1969 to C. T. Altfather discloses and claims an FSK relaying apparatus of the same general type as disclosed herein. It is common in the relaying art to transmit guard and trip frequencies, as shown in FIG. 1, from a frequency shift transmitter 2 at a remote relaying station 3 over a communication channel 4 to a frequency shift receiver 6 at a local relaying station 8. The receiver 6 is designed to receive, through a bandpass filter 10, the guard or trip frequencies as determined by the transmitter 2.

The amplified output of the filter 10 is supplied to an amplitude limiter and discriminator 12. When guard frequency is being transmitted, a logical 1 guard signal is supplied to the guard output conductor 14. Similarly, when trip frequency is being transmitted, a logical 1 trip signal is supplied to the trip conductor 16. Normally, the signal supplied to the receiver 6 from the transmitter 2 will provide logical 1 guard signal on the conductor 14 and a logical 0 trip signal on the conductor 16 whereby an alarm 18 and a trip relay 20 will be held in their deenergized conditions.

More specifically, the logical guard 1 signal supplied to the input terminal of a NOT or logical signal inversion network 22, causes a logical 0 signal to be supplied to the input terminal of the 2-20/0 trip timer 24. The output terminal of the timer 24 therefore normally supplies a logical 0 signal to a first input terminal 25 of an AND network 26 so that the logical 0 output signal of AND network 26 maintains the trip relay 20 ineffective to trip the local breaker (not shown).

The guard signal is also supplied to an alarm interrupting timer 28 which is connected to a 150/0 alarm timer 30 through a NOR network 32. The normal logical 1 guard signal maintains the timer 28 in its timed-out state whereby a logical 1 signal is supplied to the NOR network 32. Under these conditions, a logical 0 signal is supplied to the timer 30 and it remains in its "set" state in which it supplies a logical 0 signal to the NOT network 34. Therefore, during the presence of a logical 1 guard signal, a logical 1 signal is supplied by the NOT network 34 to a second input terminal 35 of the AND network 20 and to an alarm 18. Alarm 18 is normally maintained in its inactive state by the logical 1 signal received from NOT network 34.

If, however, the logical 1 guard signal is lost and no logical 1 trip signal is present for the 150 m.s. timing period of the alarm timer 30, it is assumed that transmission from the transmitter 2 has failed. The timer 30 times out and causes the NOT network 34 to remove its logical 1 output signal from the second input terminal 35 of the AND network 26 to prevent operation of the trip relay 20 and to provide a logical 1 signal to energize the alarm 18. The timer 28 acts upon the reoccurrence of the logical 1 guard signal to maintain the timer 30 in its timed-out condition for its 15 m.s. timing interval.

When the transmitter 2 is actuated to terminate the transmission of the guard signal and to initiate the transmission of the trip signal, the guard conductor 14 will have a logical 0 signal and the trip conductor 16 will have a logical 1 signal. The logical 0 guard signal causes the NOT network 22 to supply a logical 1 signal to the trip timer 24 which thereupon starts to time out.

The trip conductor 16 is connected to a second input terminal 39 of the NOR network 32, to the second input terminal 35 of the AND network 26 and to the NOT network 34 through a diode 40. It is also connected to a NOT network 42. The diode 40 prevents the NOT network 34 from supplying a logical 1 output signal to the second input terminal 39 while permitting the trip conductor 16 to supply its logical 1 signal to terminal 35 of the AND network 26.

Thus, the presence of a logical 1 trip signal at the output of the receiver 6 will arm terminal 35 of AND network 26 to ultimately cause breaker trip. At the same time, a logical 1 trip signal will hold alarm 18 in its inactive state as described above in connection with the description of alarm 18 reaction to the presence of a logical 1 guard signal. The details of implementation of the logic circuitry associated with alarm 18, which form no part of the present invention, may be had by reference to the above-named U.S. Pat. No. 3,443,159.

When the logical 1 trip signal is supplied to the input of the NOT network 42, its output supplies a logical 0 signal to one input terminal 44 of a NOR network 46 which, in the presence of a logical 0 signal at its second input terminal 48, provides a logical 1 input signal to the third input terminal 50 of the AND network 26. When the trip timer 24 times out, as it will in the absence of a logical 1 guard signal, and supplies its logical 1 signal to the terminal 25, the AND network 26 supplies a logical 1 signal to the trip relay 20 which causes the associated breaker (not shown) to trip.

In the event of a signal-to-noise ratio (hereinafter SNR) below an established value, false tripping could occur. To prevent this, a noise ratio monitor 100 is provided. The monitor 100, as shown in FIG. 1, has first and second input terminals 101 and 102 connected on the input and output sides respectively of the bandpass filter 10. An output terminal 104 of the filter 10 is connected to the second input terminal 48 of the NOR network 46. As will be explained in detail below, the noise ratio monitor 100 will, at signal-to-noise levels above said established value, provide a logical 0 signal at terminal 104. In the event of the occurrence of an SNR less than said established value, a logical 1 signal is provided at terminal 104 and no tripping can occur. Under these conditions, secondary or back-up protection is utilized to trip the breaker, if necessary.

Figure 2:
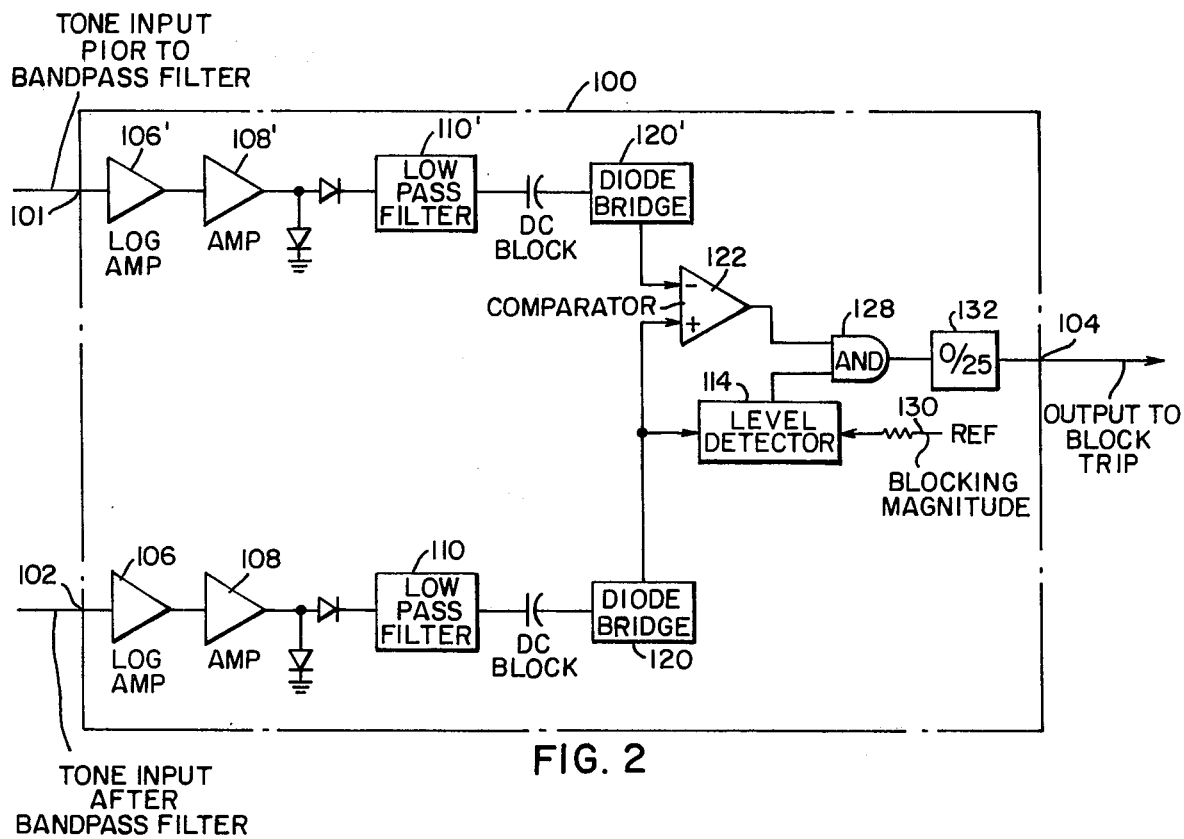
FIG. 2 is a schematic diagram of the noise ratio monitor shown in FIG. 1.

The noise ratio monitor 100, as shown in FIG. 2, comprises a pair of log amplifiers 106 and 106' (which, for example, could be Texas Instruments SN 76502 devices), a pair of operational amplifiers 108 and 108' (which, for example, could be Texas Instruments SN 52741 devices), a pair of low pass filters 110 and 110', a pair of full wave bridge rectifiers 120 and 120', a level detector 114, a comparator 122, an AND network 128 and a timer 132. The bandpass filter 10 may, for example, have a 170 Hz bandwidth so that it will pass both the guard and trip frequencies and a center frequency which is midway between the guard and trip frequencies.

The detector 100 is similar to the detector 100 of said copending application Ser. No. 568,233 in that the log of the output voltage of the bandpass filter 10 is derived by means of a log amplifier 106, amplified by an operational amplifier 108, rectified by a diode bridge rectifier 120 and supplied to a level detector 114. The output quantity supplied to the level detector 114 is, as is more fully described in said copending application, proportional to the signal-to-noise ratio of the voltage supplied to the discriminator 12. This signal represents the quantity S/N when S is greater than N and the quantity N/S when N is greater than S.

In accordance with the teachings herein, the distinction between an S/N ratio and an N/S ratio is determined by a second log generating network comprising a log amplifier 106', an operational amplifier 108', a diode bridge rectifier 120' and a comparator 122. The plus input terminal of the comparator 122 is connected to the output of the bridge rectifier 120 while the negative input terminal is connected to the output of the bridge rectifier 120'.

Figure 3:
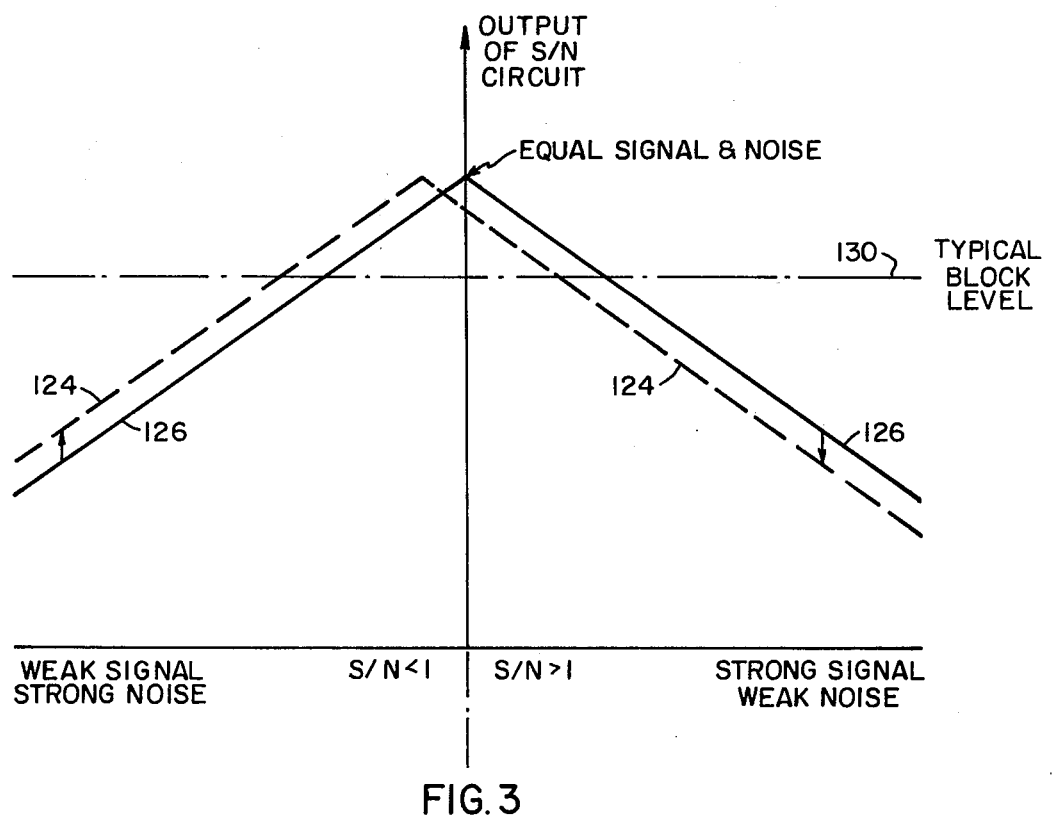
FIG. 3 illustrates graphically the relationship between the signal-to-noise ratios derived from the voltages at the input and output of the bandpass filter shown in FIG. 1.

As illustrated in FIG. 3, the dotted line 124 represents the magnitude of the output of the bridge rectifier 120 while the solid line 126 represents the magnitude of the output of the rectifier 120'. It will be apparent that for signal-to-noise ratios greater than 1, the curve 126 has a greater magnitude than the curve 124. At signal-to-noise ratios less than 1, the curve 124 has a greater magnitude than the curve 126. The comparator 122 determines the relative polarity of the output quantities of the rectifiers 120 and 120'. Whenever the magnitude of the output quantity 124 of rectifier 120 exceeds the magnitude of the output quantity 126 of the rectifier 120', the comparator 122 provides a logical 1 output signal to the AND network 128 thereby arming one input terminal of the AND network 128. Conversely, when the magnitude of the output quantity 126 exceeds the magnitude of the output quantity 124, the comparator 122 provides a logical 0 output signal to the AND network 128.

If the absolute magnitude of the quantity 124 is above the blocking magnitude 130, the level detector 114 will provide a logical 0 signal to the AND network 128 and the network 128 is ineffective to actuate the timer 132 to cause a logical 1 blocking output signal at the output terminal 104 regardless of the output signal from comparator 122. If, however, the absolute magnitude of the output quantity 124 decreases below the magnitude 130, the level detector 114 will supply a logical 1 output signal to the other input terminal of AND network 128. It should be noted that the blocking magnitude 130 is a reference voltage signal proportional to an acceptable level of SNR in the transmitted signal. This reference voltage signal may be internally generated within level detector 114 or may be generated externally thereof and fed to level detector 114.

This causes the AND network 128 to energize the timer 132 which, without intentional delay, provides a logical 1 blocking signal at the output terminal 104 which is applied to the input terminal 48 of the NOR network 46. This precludes application of a logical 1 signal at terminal 50 of the AND network 26 to prevent any energization of the trip relay 20.

When the S/N quantity 124 increases in magnitude above the blocking magnitude 130, the level detector 114 removes its logical 1 signal from the AND network 128 and the timer 132 starts to time-out its 25 m.s. resetting time interval. If the S/N quantity magnitude 124 remains above the blocking magnitude 130 for over 25 m.s., the blocking signal from the output terminal 104 is removed and the relay 20 will again be able to operate normally.

What is claimed and is desired to be secured by United States Letters Patent is as follows:

1. In a relaying network having guard and trip signal input means, a trip relay and control circuit means cooperatively coupling said guard and trip signal input means and said trip relay, monitoring apparatus for blocking actuation of said trip relay whenever the signal-to-noise ratio of a transmitted signal exceeds a predetermined value, said apparatus comprising:
   a. a bandpass filter having an input terminal adapted to receive a transmitted signal and an output terminal adapted to forward a filtered signal therefrom to said guard and trip signal input means;
   b. first signal-to-noise detecting circuit means connected to said bandpass filter input for generating a first output signal which is a function of the signal-to-noise ratio of the transmitted signal;
   c. second signal-to-noise detecting circuit means connected to said bandpass filter output for generating a second output signal which is a function of the signal-to-noise ratio of the filtered transmitted signal;

d. means for generating a reference voltage signal proportional to a predetermined acceptable value of a signal-to-noise ratio in the transmitted signal;
e. level detection means adapted to receive said second output signal and said reference voltage signal for comparing said signals and for generating a third output signal whenever said second output quantity exceeds said reference signal; and
f. comparator means, adapted to receive said first, second and third output signals and having an output connected to said control circuit means, for generating a blocking signal usable to block coupling of said trip input means and said trip relay whenever said first, second and third output signals reach a predetermined relationship.

2. The apparatus according to claim 1 wherein said first and second signal-to-noise detecting circuit means comprise:
a. an input terminal adapted to receive a transmitted signal;
b. amplifying means connected to said input terminal for generating an output signal which is proportionally related to the logarithm of the signal-to-noise ratio of a received signal; and
c. rectifying means connected to receive said output signal of said amplifying means for generating an output signal which is proportional to the absolute value of the signal-to-noise ratio of a received signal.

3. The apparatus according to claim 2 wherein said comparator means comprises:
a. first circuit means adapted to receive said first and second output signals for generating a fourth output signal whenever said first and second output signals reach a predetermined relationship; and
b. second circuit means adapted to receive said third and fourth output signals for generating said blocking signal whenever said third and fourth output signals reach a predetermined relationship.

4. The apparatus according to claim 1 wherein said comparator means comprises:
a. first circuit means adapted to receive said first and second output signals for generating a fourth output signal whenever said first and second output signals reach a predetermined relationship; and
b. second circuit means adapted to receive said third and fourth output signals for generating said blocking signal whenever said third and fourth output signals reach a predetermined relationship.

5. A signal-to-noise detector comprising an input terminal for energization by the transmitted alternating voltage, a bandpass filter having an input circuit energized from said terminal and having an output circuit, a first and a second signal-to-noise detecting network having an input circuit and an output circuit, each of said detecting networks being effective to provide an output quantity of its said output circuit which is a function of the signal-to-noise ratio of the voltage supplied to its said input circuit, said input circuit of said first detector network being energized by a voltage supplied from said input terminal to said input circuit of said bandpass filter, said input circuit of said second detector network being energized by the voltage output of said bandpass filter, first and second comparator networks, each of said comparator networks having a pair of input circuits and an output circuit, said input circuits of said first comparator network being individually connected to said output circuits of said signal-to-noise detecting networks, said first comparator network being effective to provide a given logical output at its said output circuit at a first relative polarity of the quantities applied to its said input circuits, a level detector having an input circuit and an output circuit, said input circuit of said level detector being connected to said output circuit of said second signal-to-noise detecting network, said level detector being effective to provide a first logical output when the magnitude of the quantity applied thereto from said second signal-to-noise detecting network is above a predetermined minimum value, said second comparator network having one of its said input circuits connected to said output circuit of said level detector and the other of its said input circuits connected to said output circuit of said first comparator network, said second comparator network being effective to provide a desired logical output at its said output circuit solely when said given and said first logical outputs are applied to its said input circuits.

6. The detector of claim 5 in which each of said signal-to-noise networks includes a log generating means.

7. The detector of claim 6 in which each of said signal-to-noise networks includes a rectifying network and a low pass filter in series between its said log generating means and its said rectifying network.

8. The detector of claim 7 in which each of said signal-to-noise networks includes a direct current blocking device in series between its said low pass filter and the said rectifying network.

* * * * *